United States Patent
Miura (10) Patent No.: US 6,481,682 B2
(45) Date of Patent: Nov. 19, 2002

(54) PLATE MEMBER MOUNTING STRUCTURE

(75) Inventor: Hideya Miura, Toyoakeno (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/887,564

(22) Filed: Jun. 25, 2001

(65) Prior Publication Data

US 2002/0005464 A1 Jan. 17, 2002

(30) Foreign Application Priority Data

Jul. 4, 2000 (JP) ........................................ 2000-202629

(51) Int. Cl.$^7$ ................................................. G09F 7/18
(52) U.S. Cl. ...................... 248/231.9; 248/544; 248/73; 248/27.3; 24/458; 24/297; 403/329; 411/508; 411/509
(58) Field of Search .......................... 403/329; 411/508, 411/509, 510; 24/458, 297; 248/231.9, 544, 73, 71, 27.3, 220.22

(56) References Cited

U.S. PATENT DOCUMENTS

| | | | |
|---|---|---|---|
| 4,602,760 A | * | 7/1986 | Tiefenbach et al. .......... 248/544 |
| 4,865,505 A | * | 9/1989 | Okada ......................... 411/512 |
| 5,193,961 A | * | 3/1993 | Hoyle et al. ................. 411/553 |
| 5,507,610 A | * | 4/1996 | Benedetti et al. ............ 411/553 |
| 5,533,237 A | * | 7/1996 | Higgins ........................ 24/289 |
| 5,649,783 A | * | 7/1997 | Ichikawa et al. ............. 403/386 |
| 5,662,375 A | * | 9/1997 | Adams et al. ................ 296/214 |
| 5,671,513 A | * | 9/1997 | Kawahara et al. .......... 24/573.1 |
| 5,718,549 A | * | 2/1998 | Noda et al. .................. 411/553 |
| 5,774,949 A | * | 7/1998 | Cornell et al. ................ 24/293 |
| 5,850,676 A | * | 12/1998 | Takahashi et al. ............. 24/297 |
| 6,074,150 A | * | 6/2000 | Shinozaki et al. ........... 411/508 |
| 6,264,393 B1 | * | 7/2001 | Kraus .......................... 403/282 |
| 6,317,937 B1 | * | 11/2001 | Ishihara et al. ............... 24/297 |
| 6,353,981 B1 | * | 3/2002 | Smith ........................... 24/295 |

FOREIGN PATENT DOCUMENTS

| | | |
|---|---|---|
| JP | 8-200333 | 8/1996 |
| JP | 11-230137 | 8/1999 |
| JP | 11-257317 | 9/1999 |

\* cited by examiner

Primary Examiner—Kimberly Wood
(74) Attorney, Agent, or Firm—Kanesaka & Takeuchi (57) ABSTRACT

A plate member mounting structure is used to mount a plate to a panel with an opening without forming a hole to the plate. The mounting structure is formed of a plate member to be attached to the panel and formed on the plate, and a clip to be disposed in the opening of the panel. The plate member has an insertion portion, and an engagement portion to project outwardly from an outer peripheral portion of the insertion portion. The clip includes an accommodating portion for receiving the insertion portion of the plate member, an engagement piece provided at the accommodating portion and engaging the engagement portion of the plate member, an anchor piece formed at one side of the clip to engage the panel, and a positioning piece formed at a head portion of the clip for engaging the panel together with the anchor piece.

11 Claims, 6 Drawing Sheets

Fig. 6
Prior Art

PLATE MEMBER MOUNTING STRUCTURE

BACKGROUND OF THE INVENTION AND RELATED ART STATEMENT

The present invention relates to a mounting structure for a plate member which is mounted to an opening formed in a panel of a vehicle.

Figure 5:
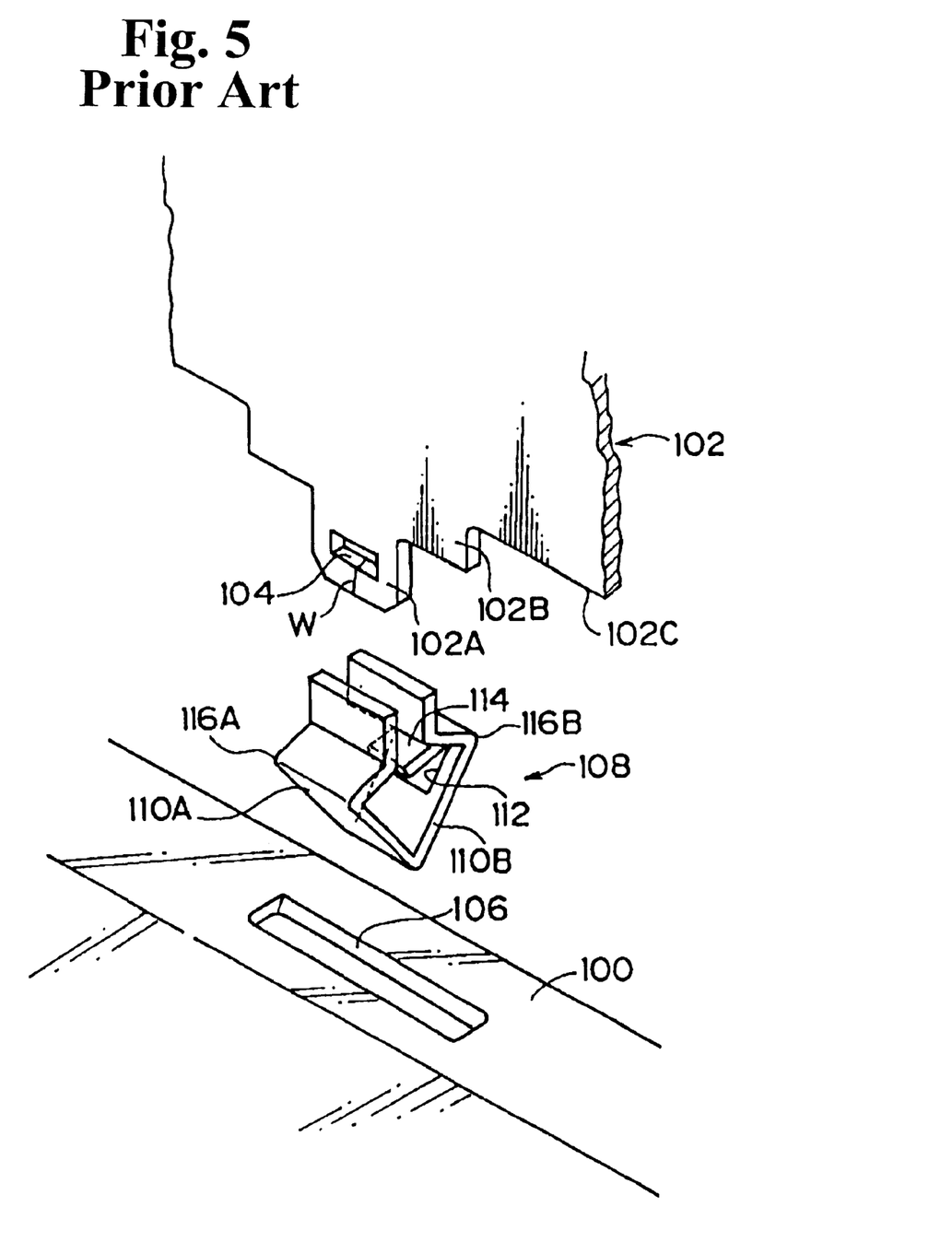
FIG. 5 is an exploded perspective view showing a conventional plate member mounting structure.
Figure 6:
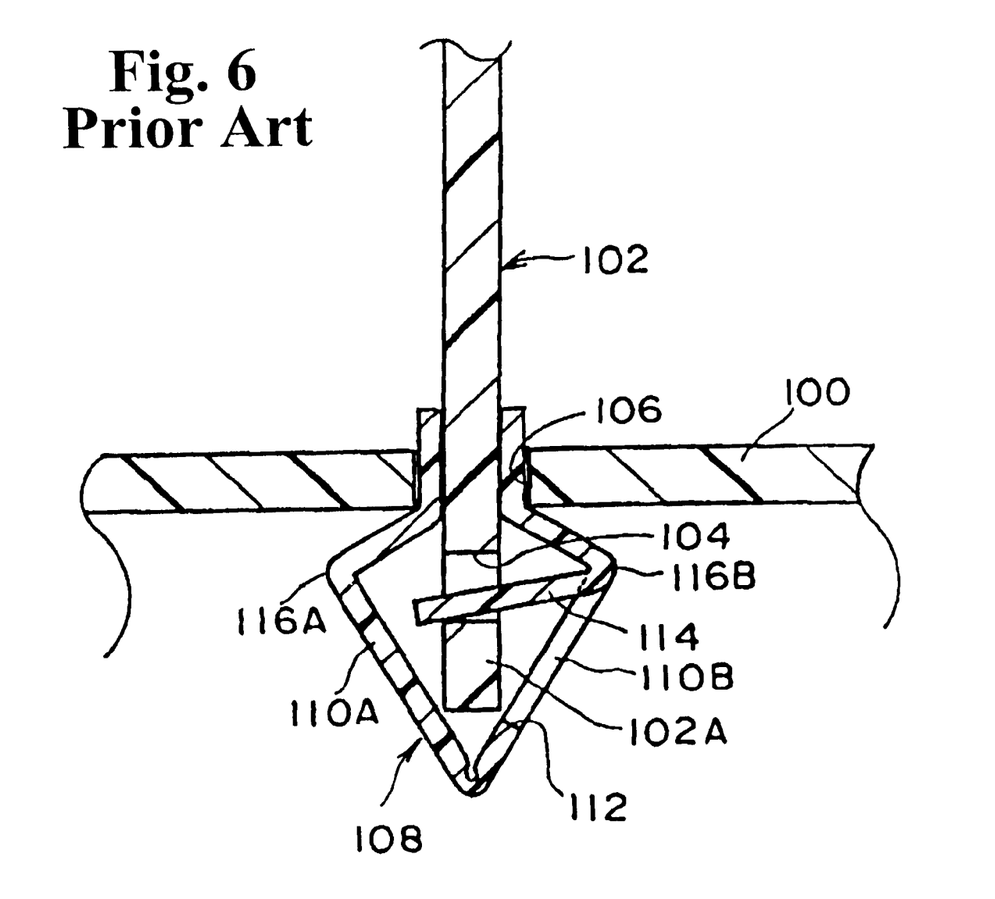
FIG. 6 is a cross-sectional view showing a state in which an instrument panel is mounted to a body panel via a clip used in the conventional plate member mounting structure.

As shown in FIGS. 5 and 6, an instrument panel 102 is mounted to a body panel 100 of a vehicle. Insertion portions 102A, 102B are formed at the distal end portion of the instrument panel 102. A mounting hole 104 is formed in the insertion portion 102A.

A rectangular hole 106 is formed in the body panel 100. The insertion portions 102A, 102B of the instrument panel 102 can be inserted through the rectangular hole 106, and an abutment 15 surface 102C abuts against the body panel 100. A metal clip 108 can be mounted to the instrument panel 102. The clip 108 is folded over in two, and opposing anchor pieces 110A, 110B thereof are elastically deformable. Central portions of the anchor pieces 110A, 110B project outwardly, and the space between the anchor piece 110A and the anchor piece 110B narrows toward the distal end side.

A U-shaped cut-out 112 is formed without cutting one transverse side in the central portion of the anchor piece 110B, and a projection piece 114 is made to project inwardly. The projection piece 114 is elastically deformable. When the insertion portion 102A of the instrument panel 102 passes through the space between the anchor pieces 110A, 110B, the projection piece 114 is pushed outwardly, and returns to its original state at the mounting hole 104 of the instrument panel 102, and is anchored on the edge portion of the mounting hole 104.

In this way, the clip 108 is mounted to the instrument panel 102. The distance between peak portions 116A, 116B of the anchor pieces 110A, 110B is wider than the width of the rectangular hole 106 formed in the body panel 100.

Because the anchor pieces 110A, 110B are elastically deformable, when the anchor pieces 110A, 110B are inserted through the rectangular hole 106, they are pressed and contracted. Upon passing through the rectangular hole 106, the anchor pieces 110A, 110B return to their original states, and are anchored at the edges of the rectangular hole 106.

In this way, the clip 108 to be mounted to the instrument panel 102 can be connected to the body panel 100, and the instrument panel 102 can be mounted to the body panel 100 via the clip 108.

However, in order to mount the clip 108 to the instrument panel 102, the mounting hole 104 must be formed in the insertion portion 102A of the instrument panel 102. Generally, when a molded product in which a hole is formed is molded, because the material moves or flows around the hole, a weld W is formed at the portion where the material is joined at the periphery of the hole.

Because the joining of the material is insufficient at this weld portion, the strength of this portion is less than that at the other portions. Further, there is a strong possibility that cracking may occur at the weld portion due to changes over time. In this case, the instrument panel 102 may separate from the clip 108. Also, because the clip 108 is made of metal, when the clip 108 is mounted to the body panel 100, an abnormal sound arises. Further, rusting of the clip 108 is also problematic.

In view of the above, an object of the present invention is to provide a plate member mounting structure which enables mounting to a body panel without forming a hole in a plate member.

SUMMARY OF THE INVENTION

In the first aspect of the invention, an opening is formed in a panel of a vehicle, and a clip is mounted to the opening. A plate member is engaged with the clip and is mounted to the panel via the clip. An insertion portion, at whose outer peripheral portion an engagement portion is formed convexly, is formed at the plate member, and is inserted into an accommodating portion of the clip.

An engagement piece, with which the engagement portion engages, is formed at the accommodating portion. An anchor piece, which is pushed so as to contract at a time of passing through the opening and which returns to its original state after having passed through the opening, is formed at the clip. After the anchor piece passes through the opening, a positioning piece formed at a head portion of the clip abuts against the panel such that the panel is nipped between the positioning piece and the anchor piece.

In this way, by forming the engagement portion convexly at the outer peripheral portion of the plate member and by forming the engagement piece, which is engageable with the engagement portion, at the clip, the plate member and the clip can engage even if no mounting hole is formed in the plate member. Thus, problems such as welds or cracks arising due to formation of a mounting hole in the plate member, do not arise.

Further, in a state in which the clip is mounted to the panel, the panel is nipped between the positioning piece and the anchor piece formed at the clip. Thus, the clip does not rattle.

In the second aspect of the invention, a cut-out, which makes a distal end of the insertion portion into a hook portion, is provided. In this way, since the engagement piece can be engaged merely by providing the cut-out, the cost of the plate member does not increase.

In the third aspect of the invention, the cut-out is formed by a horizontal surface and an inclined surface. The horizontal surface is formed parallel to a direction orthogonal to a direction of insertion of the insertion portion. The inclined portion is positioned at a base portion side of the insertion portion, and is formed so as to be inclined with respect to the horizontal surface.

In this way, by forming the inclined surface, the opening of the cut-out is made wide. Also, the engagement piece can easily engage, and workability is thus good. Further, by forming the horizontal surface, even if the insertion portion is likely to come out from the accommodating portion, the engagement piece is not pushed so as to spread, as would be the case with an inclined surface whose distal end was wide. Thus, the insertion portion does not come out from the accommodating portion.

In the fourth aspect of the invention, the engagement piece has elasticity, and has a tapered surface which can planarly contact the inclined surface. In this way, due to the inclined surface planarly contacting the taper surface of the engagement piece, rattling at the time the plate member is mounted to the clip can be prevented.

In the fifth aspect of the invention, the distal end of the hook portion is tapered. In this way, the clip can be easily inserted into the accommodating portion. As a result, workability is good.

In the sixth aspect of the invention, a stopper is formed at a lower portion of the accommodating portion of the clip. The stopper limits the movement of the insertion portion at a time of insertion of the insertion portion. Thus, the insertion portion is positioned not only by the positioning due to engagement of the anchor piece and the cut-out of the insertion portion, but also by the stopper. Further, by providing the stopper, the clip can be reinforced.

In the seventh aspect of the invention, the clip is molded from a synthetic resin. In this way, when the clip is mounted to the panel, there is no fear that an abnormal sound will arise. Further, the problem of rusting of the clip does not arise. Moreover, the cost of the clip can be reduced.

BRIEF DESCRIPTION OF THE DRAWINGS

FIGS. 3A through 3C are cross-sectional views taken along line 3—3 of FIG. 1, wherein FIG. 3A shows a state before the clip is mounted to an instrument panel, FIG. 3B shows a state in which the clip is being mounted to the instrument panel, and FIG. 3C shows a state in which the clip is mounted to the instrument panel;

FIGS. 4A and 4B are cross-sectional views taken along line 4—4 of FIG. 1, wherein FIG. 4A shows a state in which the instrument panel is being mounted to a body panel via the clip, and FIG. 4B shows a state in which the instrument panel is mounted to the body panel;

DETAILED DESCRIPTION OF PREFERRED EMBODIMENTS

Figure 1:
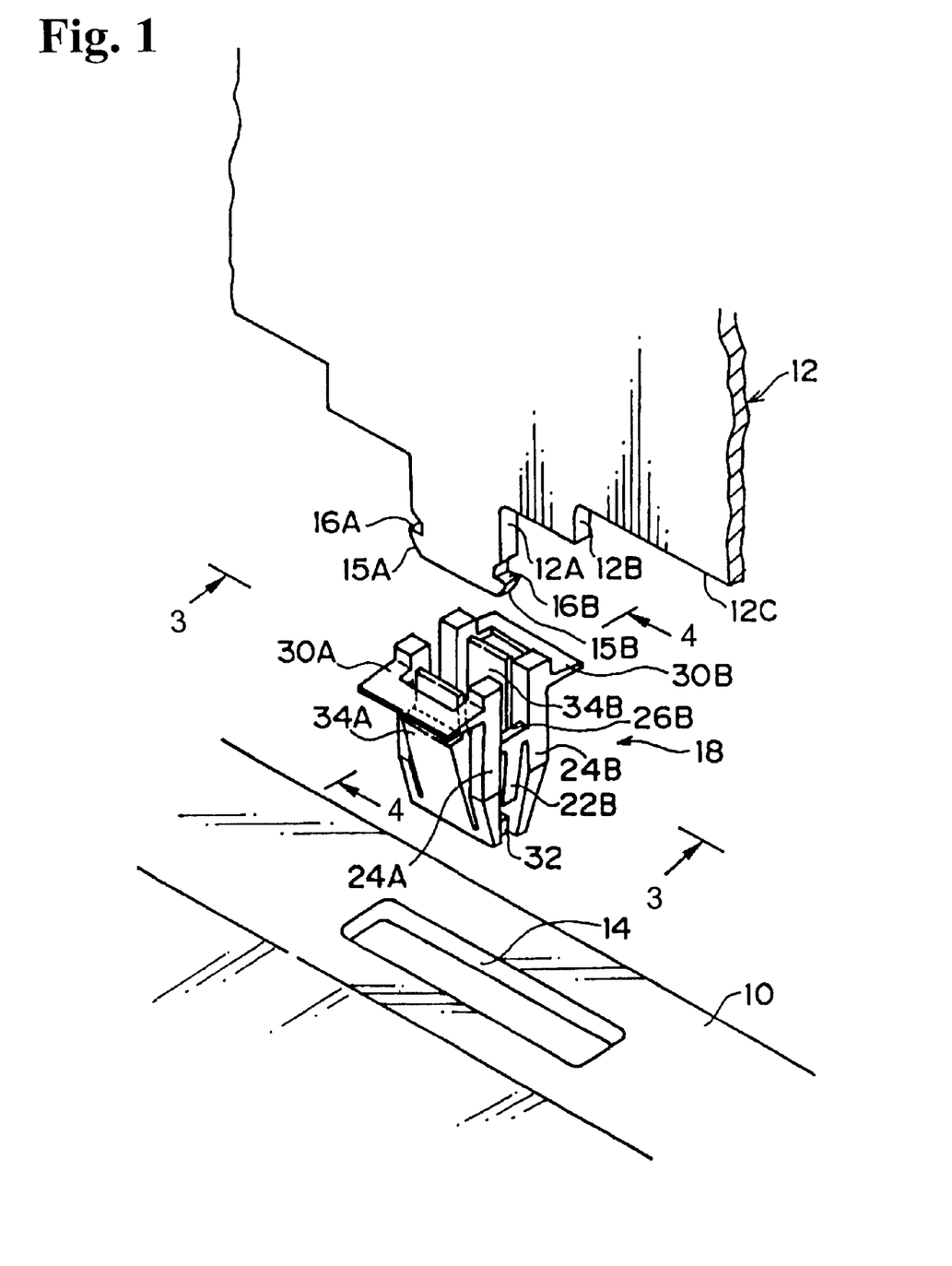
FIG. 1 is an exploded perspective view showing a plate member mounting structure relating to an embodiment of the present invention.

As shown in FIG. 1, an instrument panel 12 is mounted to a body panel 10 of a vehicle. Insertion portions 12A, 12B are formed at a distal end portion of the instrument panel 12. A rectangular hole 14 is formed in the body panel 10, and the insertion portions 12A, 12B can be inserted therethrough. The insertion portions 12A, 12B are inserted through the rectangular hole 14, and an abutment surface 12C abuts against the body panel 10.

A pair of cut-out portions 16A, 16B serving as engagement portions is formed in the outer peripheral portion of the insertion portion 12A. Hook portions 15A, 15B are formed at the distal end of the insertion portion 12A.

Figures 3A, 3B, 3C:
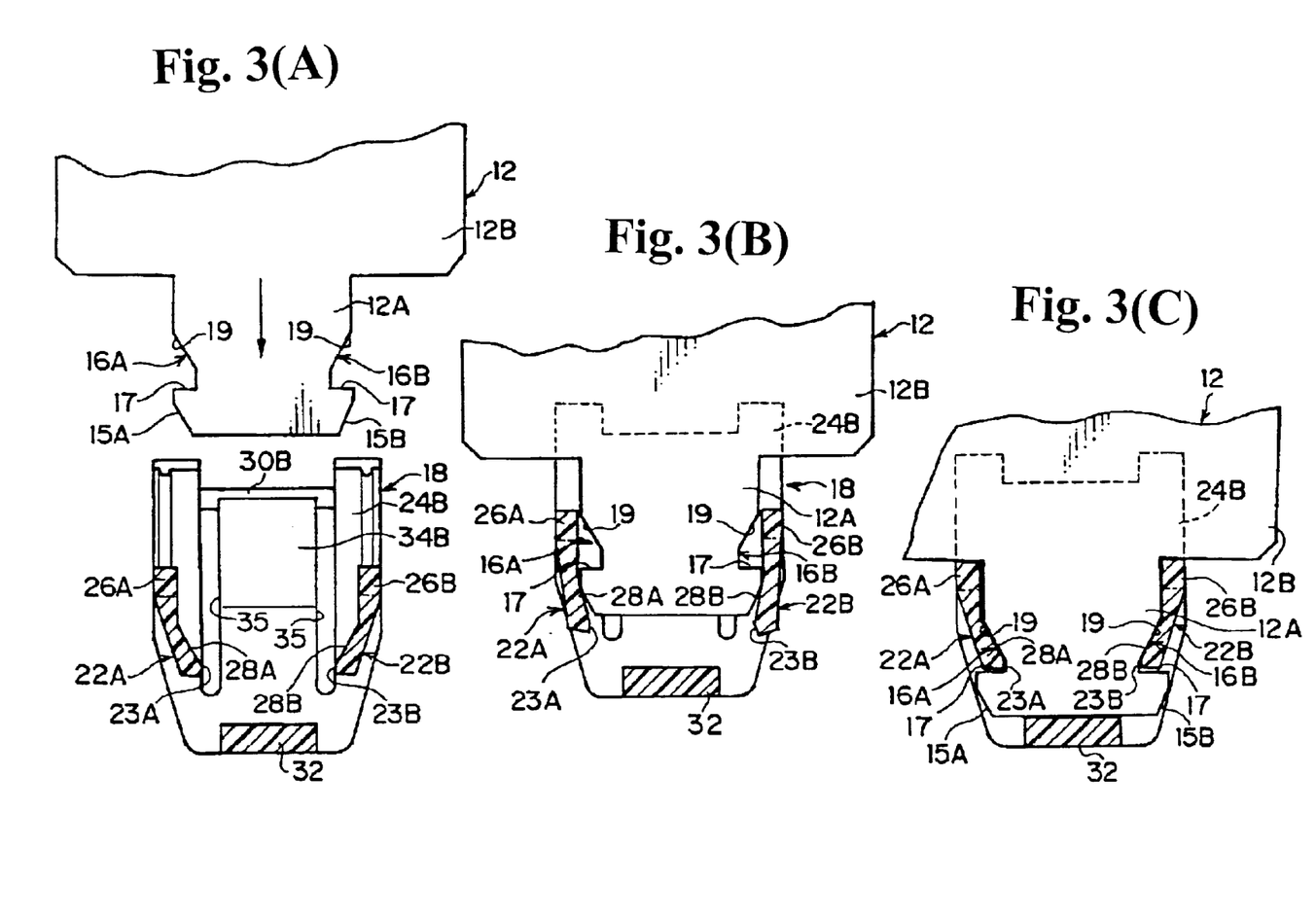

As shown in FIG. 3A, each of the cut-out portions 16A, 16B is formed by a horizontal surface 17 and an inclined surface 19. The horizontal surfaces 17 are formed parallel to a direction orthogonal to the direction of insertion (direction of the arrow) of the insertion portion 12A. The inclined surfaces 19 are positioned at a base portion side of the insertion portion 12A, and are formed so as to be inclined with respect to the horizontal surfaces 17.

By forming the inclined surfaces 19, the openings of the cut-outs 16A, 16B are widened, and it is easy for elastic pieces 22A, 22B, which serve as engagement pieces and are provided at an accommodating portion 20 of a clip 18 which will be described later, to engage the cut-outs 16A, 16B. Thus, workability is good.

Further, by forming the horizontal surfaces 17, even if an attempt is made to separate the insertion portion 12A from the accommodating portion 20, the elastic pieces 22A, 22B are not pushed and spread apart, which would otherwise occur with inclined surfaces having a wide distance between distal ends thereof. Thus, the insertion portion 12A does not come out from the accommodating portion 20.

Next, the clip used in the panel mounting structure relating to the present embodiment will be described.

Figure 2:
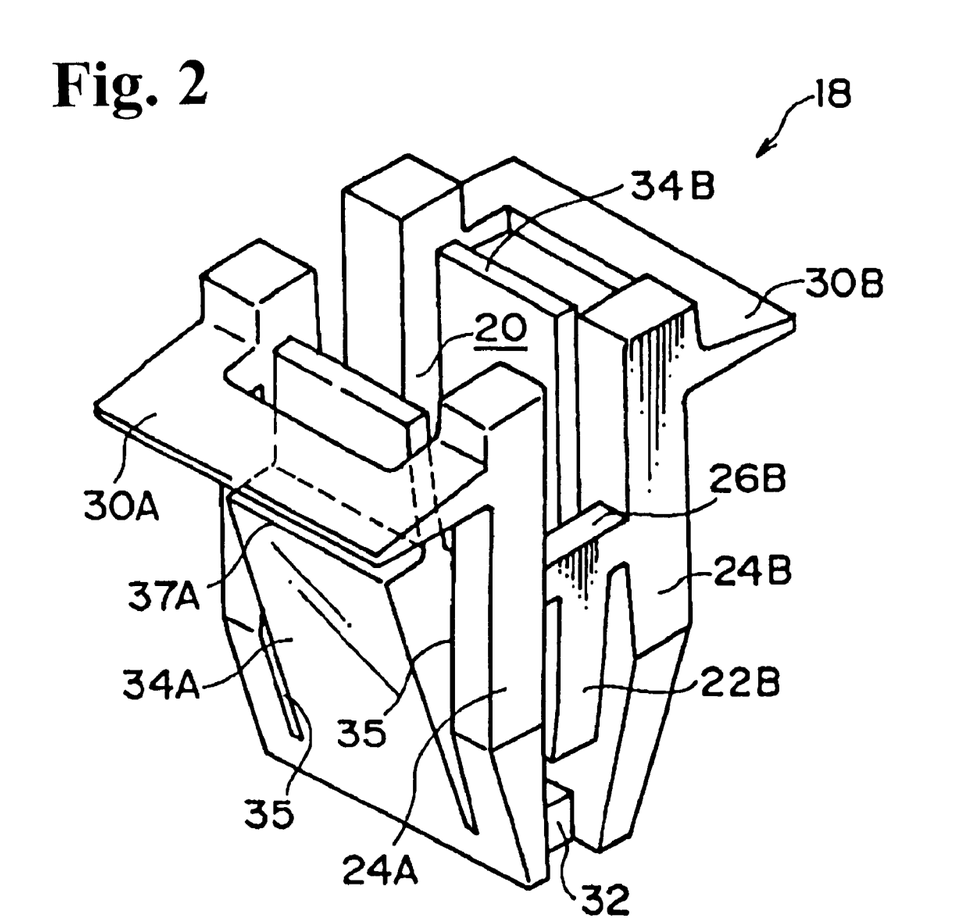
FIG. 2 is a perspective view showing a clip used in the plate member mounting structure relating to the embodiment.

As shown in FIG. 2 and FIG. 3A, there is a gap between a wall surface or portion 24A and a wall surface or portion 24B of the clip 18. Centers of side end portions of the wall surface 24A and the wall surface 24B are spanned by connecting pieces 26A, 26B, such that the wall surface 24A and the wall surface 24B are formed integrally. The accommodating portion 20, into which the insertion portions 12A, 12B of the instrument panel 12 can be inserted, is thereby formed.

An elastic piece 22A extends from the connecting piece 26A, and an elastic piece 22B extends from the connecting piece 26B. The elastic pieces 22A, 22B are directed toward the accommodating portion 20, and are elastically deformable. Further, the distance between the connecting piece 26A and the connecting piece 26B is slightly larger than the width of the insertion portion 12A of the instrument panel 12.

The distance between an inner side surface 23A of the distal end portion of the elastic piece 22A and an inner side surface 23B of the distal end portion of the elastic piece 22B is slightly smaller than the width of the hook portions 15A, 15B of the insertion portion 12A.

Thus, as shown in FIG. 3B, when the hook portions 15A, 15B of the insertion portion 12A are inserted in, the elastic pieces 22A, 22B are pushed to spread apart. When the elastic pieces 22A, 22B reach the cut-out portions 16A, 16B formed in the insertion portion 12A, as shown in FIG. 3C, the elastic pieces 22A, 22B return to their original states, and are accommodated within the cut-out portions 16A, 16B.

Tapered surfaces 28A, 28B are provided at the elastic pieces 22A, 22B, and have angles of inclination which enable the tapered surfaces 28A, 28B to planarly contact the inclined surfaces 19 formed at the cut-out portions 16A, 16B.

As described above, the distance between the inner side surface 23A of the elastic piece 22A and the inner side surface 23B of the elastic piece 22B is slightly smaller than the width of the hook portions 15A, 15B. Thus, the tapered surfaces 28A, 28B of the elastic pieces 22A, 22B abut against the inclined surfaces 19 of the cut-out portions 16A, 16B so as to tightly hold thereto. Therefore, there is no rattling between the instrument panel 12 and the clip 18, and the instrument panel 12 is held such that it does not come out from the clip 18.

Positioning pieces 30A, 30B project outwardly from upper portions of the wall surfaces 24A, 24B. When the clip 18 is inserted through the rectangular hole 14 of the body panel 10, as will be described later, the positioning pieces 30A, 30B abut against the body panel 10 and position the clip 18.

The lower portions of the wall surfaces 24A, 24B are formed so as to become thinner, such that the distal end sides thereof are tapered. The clip 18 is therefore easily inserted into the rectangular hole 14. Beneath the accommodating portion 20, a stopper 32 spans between the wall surfaces 24A, 24B. The stopper 32 limits the movement of the insertion portion 12A at the time that the insertion portion 12A is inserted.

In this way, the insertion portion 12A is positioned not only by the engagement of the elastic pieces 22A, 22B and the cut-outs 16A, 16B of the insertion portion 12A, but also by the stopper 32. Also, by providing the stopper 32, the clip 18 is reinforced. Because the width at the lower portions of the wall surfaces 24A, 24B is narrow, the clip 18 is easily inserted into the rectangular hole 14. As a result, workability is good.

Figure 4A:
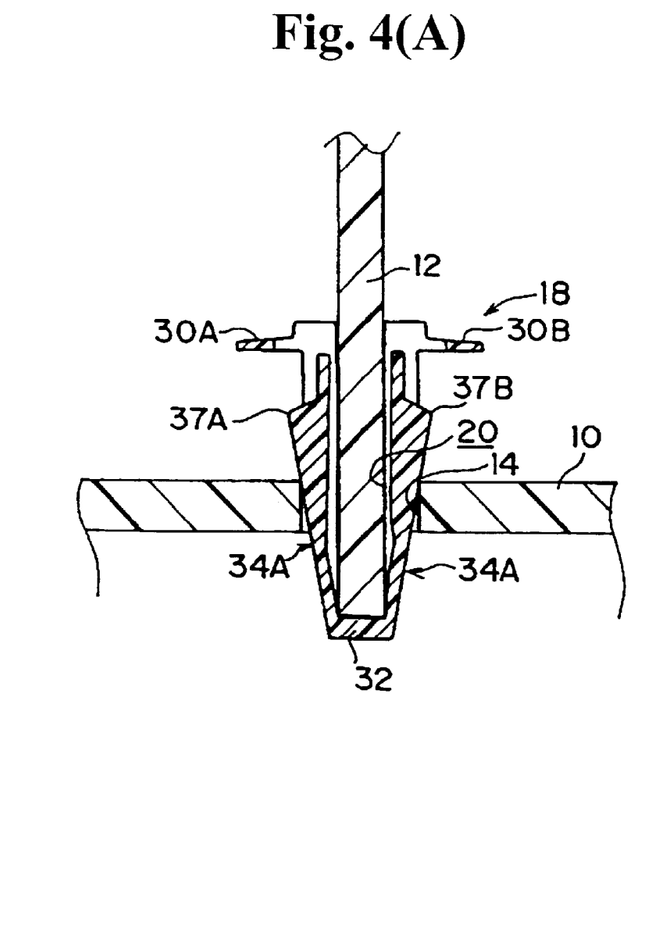

As shown in FIGS. 3A and 4A, anchor pieces 34A, 34B are provided at central portions of the wall surfaces 24A, 24B of the clip 18. Cut-outs 35 are formed at the peripheries of the anchor pieces 34A, 34B, without cutting one transverse direction side of each of the wall surfaces 24A, 24B. As a result, the anchor pieces 34A, 34B are cantilevered, and are elastically deformable.

The anchor pieces 34A, 34B jut-out in mountain-like shapes outwardly along the longitudinal directions thereof. A distance between a peak portion 37A and a peak portion 37B is slightly larger than the width of the rectangular hole 14 of the body panel 10.

Figure 4B:
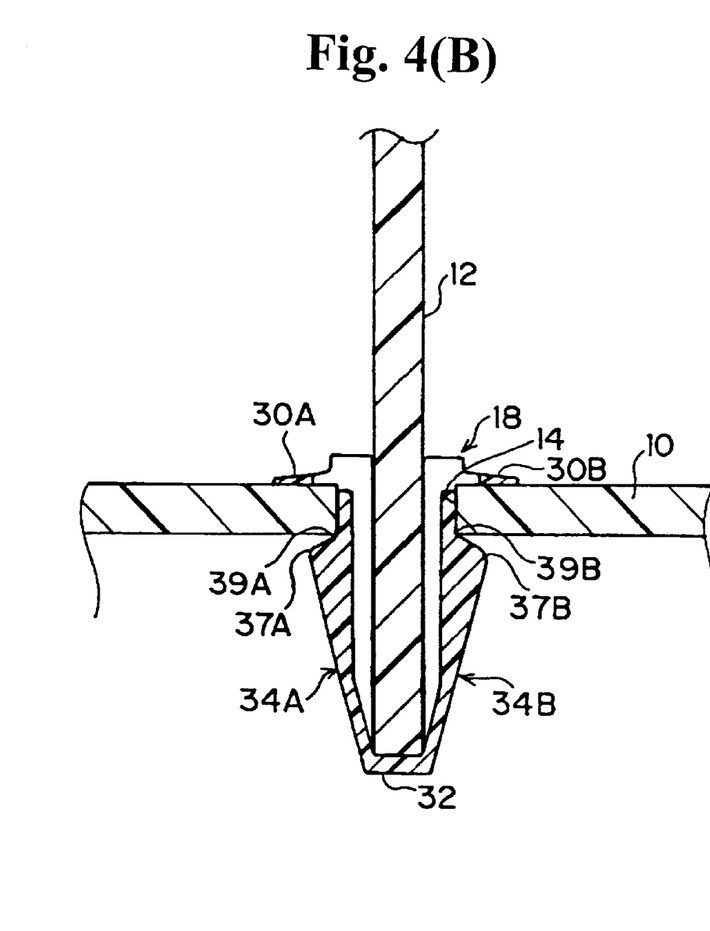

As a result, when the clip 18 is inserted into the rectangular hole 14, the anchor pieces 34A, 34B abut against edges of the rectangular hole 14. When the clip 18 is pushed further into the rectangular hole 14, the anchor pieces 34A, 34B elastically deform and are pushed so as to gradually contract inwardly, and pass through the rectangular hole 14. When the anchor pieces 34A, 34B pass through the rectangular hole 14, as shown in FIG. 4(B), the anchor pieces 34A, 34B return to their original shapes, and curved portions 39A, 39B of the anchor pieces 34A, 34B abut against the edges of the rectangular hole 14.

The distance between the curved portion 39A of the anchor piece 34A and the positioning piece 30A (as well as the distance between the curved portion 39B of the anchor piece 34B and the positioning piece 30B) is substantially the same as the plate thickness of the body panel 10. The body panel 10 is nipped between the curved portion 39A of the anchor piece 34A and the positioning piece 30A. In this way, there is no rattling between the body panel 10 and the clip 18.

Due to the above-described structure, in a state in which the clip 18 is engaged with the instrument panel 12, the clip 18 is mounted to the body panel 10, and the instrument panel 12 can therefore be mounted to the body panel 10 via the clip 18.

With the present structure, the clip 18 can be mounted to the instrument panel 12 even if no opening is formed in the instrument panel 12. Thus, the problems, such as cracks in the distal end portion of the instrument panel 12 which arise due to formation of an opening in the instrument panel 12, are eliminated.

Further, the elastic pieces 22A, 22B can be engaged merely by forming the cut-outs 16A, 16B convexly in the outer peripheral portion of the instrument panel 12. Thus, the instrument panel 12 does not become expensive.

By molding the clip 18 from a synthetic resin, there is no fear that abnormal sounds will arise when the clip 18 is mounted to the body panel 10. Further, the problem of rusting of the clip 18 does not arise. Moreover, the cost of the clip 18 can be reduced.

On the other hand, in a metal mold structure for the clip 18 of the present embodiment, parting is carried out such that undercut portions are not formed. As a result, there is no need to use a slide core in the metal mold, so that the metal mold is less expensive. Further, the metal mold can be prepared such that the surface area, per clip 18, is reduced by an amount corresponding to the surface area of the slide core. Thus, the number of clips 18 which can be manufactured can be increased.

Here, the pair of cut-out portions 16A, 16B is formed in the outer peripheral portions of the insertion portion 12A, and the distal end of the insertion portion 12A is formed as the hook portions 15A, 15B. However, it suffices for the clip 18 to be able to engage, and thus, it is not absolutely necessary to form the pair of cut-outs. A cut-out may be provided in only one side of the insertion portion 12A, and only one side made into a hook portion.

Because the present invention is structured as described above, in the first aspect of the invention, the plate member and the clip can be engaged without forming a mounting hole in the plate member. Thus, problems, such as welds or cracks, due to formation of a mounting hole in the plate member do not arise. Further, in the state in which the clip is mounted to the panel, the panel is nipped between the positioning piece and the anchor piece formed at the clip. Thus, the clip does not rattle.

In the second aspect of the invention, because the engagement piece is engaged merely by providing the cut-out, the cost of the plate member does not increase. In the third aspect of the invention, by forming the inclined surface, the opening of the cut-out is made wide, and it is easy for the engagement piece to engage. Thus, the workability is good. Further, by forming the horizontal surface, even if the insertion portion is likely to separate from the accommodating portion, the engagement piece is not pushed and spread, as would be the case with an inclined surface having a wide distal end. Thus, the insertion portion does not come out from the accommodating portion.

In the fourth aspect of the invention, rattling when the plate member is mounted to the clip can be prevented. In the fifth aspect of the invention, because the clip is easily inserted into the accommodating portion, workability is good.

In the sixth aspect of the invention, the insertion portion is positioned not only by the engagement of the engagement piece and the cut-out of the insertion portion, but also by the stopper. Further, the clip can be reinforced by providing the stopper. In the seventh aspect of the invention, when the clip is mounted to the panel, an abnormal sound does not arise. Further, the problem of the clip rusting does not arise. Moreover, the cost of the clip can be reduced.

While the invention has been explained with reference to the specific embodiments of the invention, the explanation is illustrative and the invention is limited only by the appended

What is claimed is:

1. A plate member mounting structure for mounting a plate to a panel with an opening, comprising:
   a plate member to be attached to the panel and formed on the plate, said plate member having an insertion portion, and engagement portions to project outwardly in opposite directions from an outer peripheral portion of the insertion portion; and
   a clip to be disposed in the opening of the panel and including an accommodating portion for receiving the insertion portion of the plate member; engagement pieces provided at first two sides of the accommodating portion facing each other, each engagement piece having a lower end to be able to move outwardly to receive and engage each of the engagement portions of the plate member; anchor pieces formed at second two sides of the accommodating portion perpendicular to the first two sides, said anchor pieces being located at a horizontal level substantially same as that of the engagement pieces and being able to move inwardly; and two positioning pieces formed at the second two sides, respectively, for engaging the panel together with the anchor pieces.

2. A plate member mounting structure according to claim 1, wherein each of said anchor pieces has elasticity such that when the anchor piece is pushed to pass through the opening, the anchor piece deforms inwardly and returns to an original state after having passed through the opening to thereby nip the panel between the positioning piece and the anchor piece.

3. A plate member mounting structure according to claim 1, wherein each of said engagement portions is a cut-out formed at a distal end of the insertion portion to thereby form a hook portion.

4. A plate member mounting structure according to claim 3, wherein said cut-out is formed by a horizontal surface formed parallel to a direction orthogonal to a direction of insertion of the insertion portion, and an inclined portion positioned at a base portion side of the insertion portion so as to incline with respect to the horizontal surface.

5. A plate member mounting structure according to claim 4, wherein said engagement piece has elasticity, and has a tapered surface planarly contacting the inclined portion.

6. A plate member mounting structure according to claim 3, wherein said hook portion has a tapered distal end.

7. A plate member mounting structure according to claim 1, wherein said clip has a stopper formed at a lower portion of the accommodating portion, said clip limiting a movement of the insertion portion at a time of insertion of the insertion portion.

8. A plate member mounting structure according to claim 7, wherein said clip is molded from a synthetic resin.

9. A plate member mounting structure according to claim 1, wherein said accommodating portion includes four wall portions spaced part from each other, and two connecting pieces, each connecting piece being located between two wall portions for connecting the two wall portions, respectively, each engagement piece extending downwardly from the connecting piece between the two wall portions.

10. A plate member mounting structure according to claim 9, wherein two wall portions which are not connected by the connecting pieces are connected with each other at lower and upper portions, respectively, one anchor piece being located between the two wall portions not connected by the connecting pieces to project upwardly to have a free upper end.

11. A plate member mounting structure according to claims 10, wherein each positioning piece is attached to the two wall portions not connected by the connecting pieces at the upper portions.

* * * * *